US012411037B2

(12) United States Patent
Sargeant et al.

(10) Patent No.: US 12,411,037 B2
(45) Date of Patent: Sep. 9, 2025

(54) WATER SOFTENER APPARATUS INCLUDING A SALT LEVEL INDICATOR DEVICE

(71) Applicant: Harvey Water Softeners Limited, Old Woking (GB)

(72) Inventors: W R Sargeant, Woking (GB); G M Halligan, Guildford (GB)

(73) Assignee: Harvey Water Softeners Limited, Old Woking (GB)

( * ) Notice: Subject to any disclaimer, the term of this patent is extended or adjusted under 35 U.S.C. 154(b) by 492 days.

(21) Appl. No.: 17/791,638

(22) PCT Filed: Jan. 20, 2021

(86) PCT No.: PCT/EP2021/051091
§ 371 (c)(1),
(2) Date: Jul. 8, 2022

(87) PCT Pub. No.: WO2021/148417
PCT Pub. Date: Jul. 29, 2021

(65) Prior Publication Data
US 2023/0084245 A1   Mar. 16, 2023

(30) Foreign Application Priority Data
Jan. 20, 2020   (GB) ..................................... 2000771

(51) Int. Cl.
*G01F 23/28* (2006.01)
*B01J 49/06* (2017.01)
(Continued)

(52) U.S. Cl.
CPC .............. *G01F 23/28* (2013.01); *B01J 49/06* (2017.01); *B01J 49/75* (2017.01); *B01J 49/85* (2017.01);
(Continued)

(58) Field of Classification Search
None
See application file for complete search history.

(56) References Cited

U.S. PATENT DOCUMENTS

2006/0119484 A1* 6/2006 Chishima ............... G01G 17/04
340/539.1
2016/0292990 A1   10/2016 Pesz et al.
(Continued)

FOREIGN PATENT DOCUMENTS

CN   108585117 A   9/2018
CN   208476349 U   2/2019

OTHER PUBLICATIONS

Harvey Water Softeners, "Harvey Water Softener 40th Anniversary, youtube.com", accessed Jun. 23, 2021, Dec. 3, 2018, Publisher: https://www.youtube.com/watch?v=h2_EiECcBgU.
(Continued)

*Primary Examiner* — Richard C Gurtowski
(74) *Attorney, Agent, or Firm* — GableGotwals

(57) ABSTRACT

A water softener apparatus comprising a housing having a chamber for accommodating at least one compressed salt block having an elongated block form, the configuration accommodating the compressed salt block within the chamber with its longitudinal axis in a vertical orientation. The water softener apparatus includes a manually detachable front cover enclosing the chamber and a non-touch salt level indicator device arranged in or on the front cover of the housing above the chamber to determine a salt level from an upper end face of the compressed salt block accommodated in the chamber, the non-touch salt level indicator device determining the salt level from the upper end face of the compressed salt block through a wall of the front cover of the housing. The non-touch salt level indicator device is a
(Continued)

battery powered device and the water softener apparatus is a non-electric powered water softener apparatus.

19 Claims, 14 Drawing Sheets

(51) Int. Cl.
  *B01J 49/75* (2017.01)
  *B01J 49/85* (2017.01)
  *C02F 1/42* (2023.01)
  *G01F 25/20* (2022.01)
(52) U.S. Cl.
  CPC ............... *C02F 1/42* (2013.01); *G01F 25/20* (2022.01); *C02F 2201/002* (2013.01); *C02F 2209/008* (2013.01); *C02F 2303/16* (2013.01)

(56) References Cited

U.S. PATENT DOCUMENTS

| | | |
|---|---|---|
| 2019/0114898 A1 | 4/2019 | Wanie |
| 2019/0170560 A1 | 6/2019 | Rohr et al. |
| 2019/0314807 A1 | 10/2019 | Bowden |

OTHER PUBLICATIONS

Scott Jenkins Water Softeners, "How to Load Salt into a Block Salt Water Softener, youtube.com", accessed Jun. 23, 2021, Mar. 19, 2017, Publisher: https://www.youtube.com/watch?v=MG1wmMIAlIQ.
TwinTecsofteners, "TwinTec S3 block salt water softener, youtube. com", accessed Jun. 23, 2021, Jun. 9, 2011, Publisher: https://www.youtube.com/watch?v=Uj5Jv2JGFAY.

\* cited by examiner

WATER SOFTENER APPARATUS INCLUDING A SALT LEVEL INDICATOR DEVICE

CROSS-REFERENCE TO RELATED APPLICATIONS

This United States application is the National Phase of PCT Application No. PCT/EP2021/051091 filed 20 Jan. 2021, which claims priority to British Patent Application No. 2000771.2 filed 20 Jan. 2020, each of which is incorporated herein by reference.

FIELD OF THE INVENTION

The invention relates to a water softener apparatus of a type adapted to receive one or more large compressed salt blocks for forming brine and to a salt level indicator device for use with said water softener apparatus.

BACKGROUND OF THE INVENTION

Water softener apparatuses and systems have been developed and widely used in domestic homes of countries in which water having high minerals content or so called "hard water" is supplied. In a typical water softening system such as an ion exchange water softener, the "hard ions" are generally removed by passing the "hard water" through a water softening cylinder in which an ion exchange medium is located. The medium exchanges the "hard ions" such as calcium or magnesium ions with "soft ions" such as sodium ions.

When all the available "soft ions" in the medium are depleted after a period of water softening, the medium can be regenerated by eluting the cylinder with a salt solution such as a brine solution. The brine is typically prepared and stored in a brine tank, in which salt in its various forms such as pellets, granules or lumps will be added to from time to time so as to maintain the salinity of the brine.

It is necessary to regularly top-up the salt amount in the brine tank. Conventionally, this has been done by a user physically checking the salt level in the water softener apparatus, but this relies on a user remembering to make such regular checks. It would be desirable to negate the need for a user to manually check the salt level in a brine tank of a water softener apparatus.

OBJECTS OF THE INVENTION

An object of the present invention is to provide a water softener apparatus of a type adapted to receive one or more large compressed salt blocks for forming brine and which automatically alerts a user about a level of salt contained in the apparatus.

Another object of the present invention is to mitigate or obviate to some degree known problems associated with existing water softener apparatuses.

The above objects are met by the combination of features of the main claims; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a water softener apparatus comprising a housing, said housing having a chamber for accommodating at least one compressed salt block having an elongate block form, the configuration being such that the compressed salt block is accommodated within said chamber with its longitudinal axis in a vertical orientation. The water softener apparatus includes a manually detachable front cover enclosing the chamber and a non-touch salt level indicator device arranged in or on said front cover of the housing above the chamber so as to determine a salt level by reflecting a signal off an upper end face of a compressed salt block accommodated in the chamber and by determining a round-trip time of the reflected signal, the non-touch salt level indicator device determining the salt level from the upper end face of the compressed salt block through a wall of said front cover of the housing. The non-touch salt level indicator device is preferably a battery powered device and the water softener apparatus is a non-electric powered water softener apparatus. The water softener apparatus is preferably a hydraulically actuated device and is preferably actuated by water pressure.

In a second main aspect, the invention provides a water softener apparatus comprising: a housing, said housing having a chamber for accommodating salt; a manually detachable front cover enclosing the chamber; and a non-touch salt level indicator device arranged in or on said manually detachable front cover of the housing above the chamber so as to determine a salt level from an upper surface of the salt accommodated in the chamber, the non-touch salt level indicator device determining the salt level from the upper surface of the salt through a wall of said front cover of the housing.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In the claims hereof, any element expressed as a means for performing a specified function is intended to encompass any way of performing that function. It is thus regarded that any means that can provide those functionalities are equivalent to those shown herein.

In general, a compressed block salt, which hereinafter is referred to as a salt block, is a block form of compressed salt for use in a water softener apparatus such as a brine tank of a water softener system to provide the required salinity to the brine for, for example, regenerating a water softening column. In use, the compressed salt block can be easily loaded in bulk as a block into the housing of the brine tank, with the salt slowly releasing, i.e., dissolving, over time into the water to generate the brine.

Reference herein to a large compressed salt block for a water softener apparatus is a reference to a salt block formed by compressing loose salt in a mold or the like, typically, but not exclusively, by hydraulic compression, where the compressed salt block has a weight in the range of 1 kg to 6 kg and, more particularly, a weight in the range of 3 kg to 5 kg with the compressed salt block being provided for insertion in a chamber in a water softener apparatus, the chamber preferably being adapted to the longitudinal external shape of the compressed salt block for easy insertion of the salt block in the chamber longitudinally into said chamber.

Reference herein to "non-touch" is taken to refer to the salt level indicator device according to the invention, which is arranged in the housing above the chamber so as to determine a salt level from an upper end face of a compressed salt block accommodated in the chamber, not having any means for making physical contact with the upper end face of the compressed salt block when determining a salt level within the chamber, i.e. the salt level indicator device uses any of a light signal, an infrared signal, a sound signal, a radar signal or the like to determine a salt level within the chamber.

Figure 1:
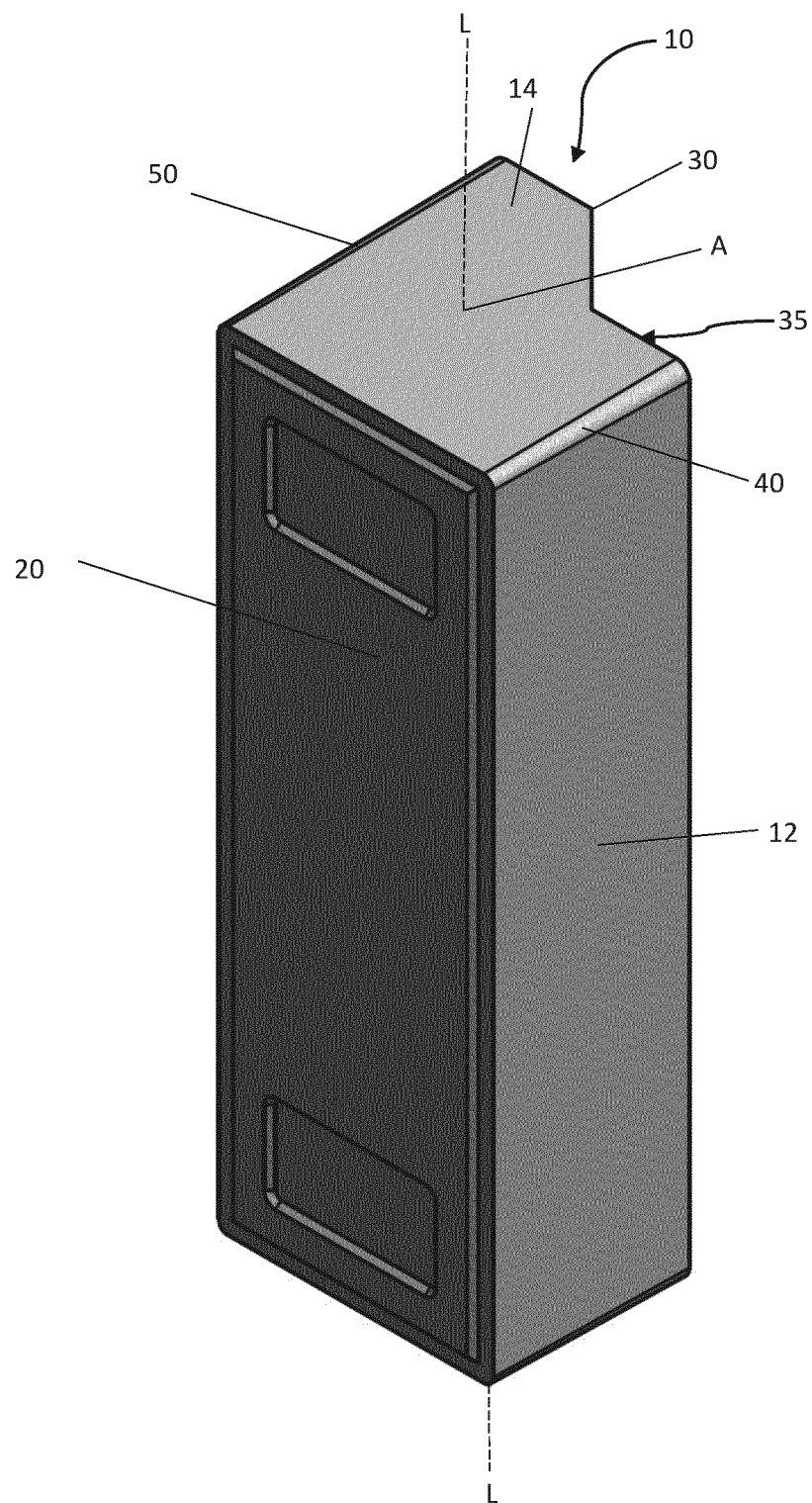
FIG. 1 is a perspective view showing a compressed salt block according to a first embodiment.

Referring to FIG. 1, shown is an embodiment of a compressed salt block 10. The compressed salt block 10 is configured to comprise a first main portion comprising an irregularly shaped extension portion adapted to be positioned in use adjacent the exterior of a water softener tank such as the water softening column, and a second portion comprising a regularly shaped block portion adapted to be positioned in use adjacent an inner wall of the housing of the water softener apparatus. The irregularly shaped extension portion and the regularly shaped block portion are integrally formed as a single compressed salt block. A primary function of both the block portion and the extension portion is to provide salt in a compressed block form for replenishing bring in a water softener apparatus, but the extension portion has additional functions as explained hereinafter. As shown in FIG. 1, the compressed salt block 10 comprises an elongated body 12 having an irregular cross section A, i.e., an irregular horizontal cross section, with the tank-facing first main portion having an extension portion 14 which extends into a space defined by an external surface of the tank and an inner wall of the housing adjacent the external surface of the tank so as to preferably position and hold the compressed salt block 10 within the housing.

Figure 2:
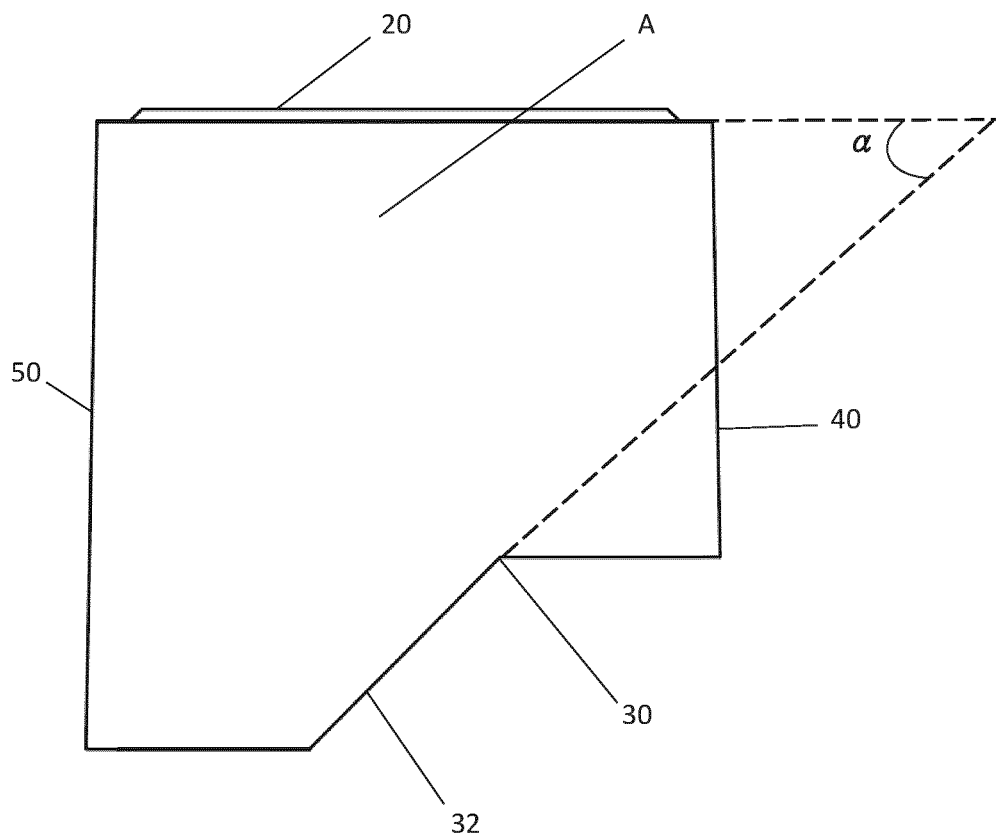
FIG. 2 is a top, cross sectional view of the compressed salt block of FIG. 1.

As shown in FIG. 2, the cross-section A of the salt block 10 comprises a base side or line 20 and a functional side 30 generally opposing the base line or side 20. At least a portion of the functional side 30 such as line 32 as shown in the figure forms an acute angle α to the base line 20 thereby forming an indented portion or an extended portion of the cross-section A. Preferably, the cross-section A is constant along the length or the longitudinal axis L-L (FIG. 1) of the body 12.

As shown in FIG. 1, the salt block includes a longitudinally extending elongated body 12 having a vertical longitudinal axis L, a top horizontal surface, and a bottom horizontal surface. The elongated body includes a block portion having a rectangular cross-section taken in a horizontal plane that is perpendicular to the vertical longitudinal axis, wherein the rectangular cross-section is defined by a major front exterior surface that is a base surface 20 of the block portion, a major rear surface along functional face 35, and a pair of exterior minor surfaces 40, 50; and an extension portion 14 formed integrally with the major rear surface of the rectangular cross-section of the block portion as a single compressed salt block.

As shown in FIGS. 1-2, the extension portion 14 has a cross-sectional shape in said horizontal plane in the form of a right truncated triangle, the extension portion having a first exterior side that is contiguous with the exterior side surface 50 of the block portion, a second side that is contiguous with the major rear surface of the block portion, and an exterior hypotenuse side 32 that extends at an acute angle relative to the base surface 20 of the block portion from a rear edge of the first exterior side toward the major rear surface of the block portion.

As shown in FIGS. 1-2, a horizontal cross-section of the elongated body is constant along the vertical longitudinal axis of the elongated body and the exterior hypotenuse side 32 of the extension portion defines a functional face 32 adapted to abut against a vertical wall or an exterior vertical surface of a tank of a water softener apparatus to position the compressed salt block within said water softener apparatus.

As seen in FIG. 1, at least the base side or face of the salt block 10 may include indentations positioned near the top and bottom faces of the salt block 10 to aid gripping of the salt block 10 by a user's fingers.

Figure 5:
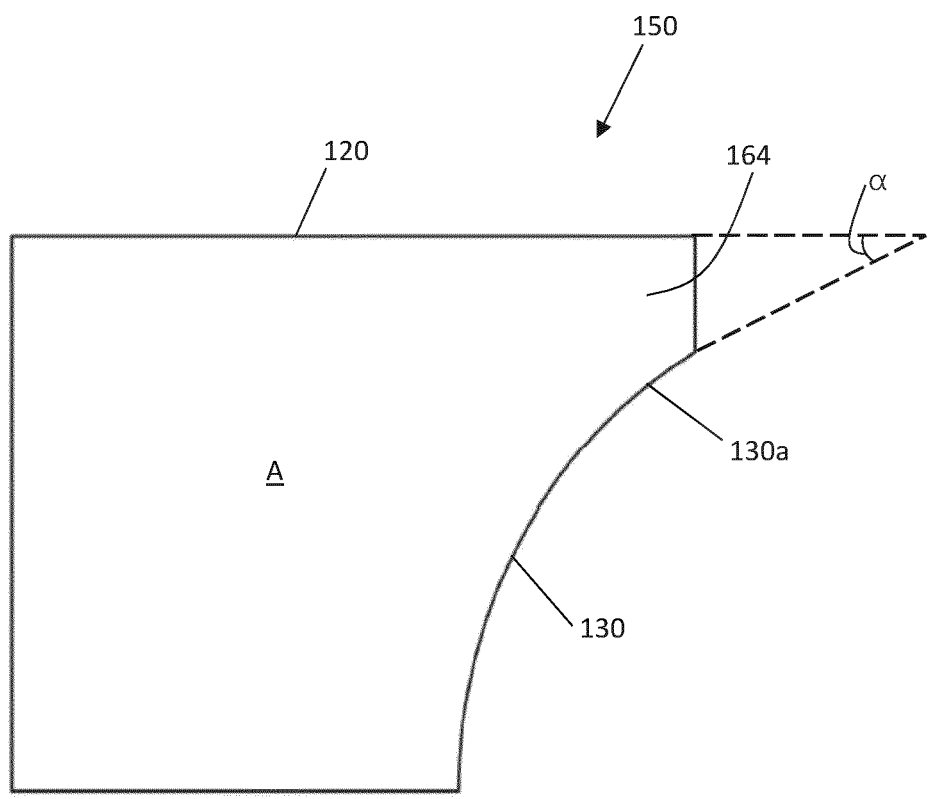
FIG. 5 is a top, cross sectional view of the compressed salt block of FIG. 4.
Figure 8:
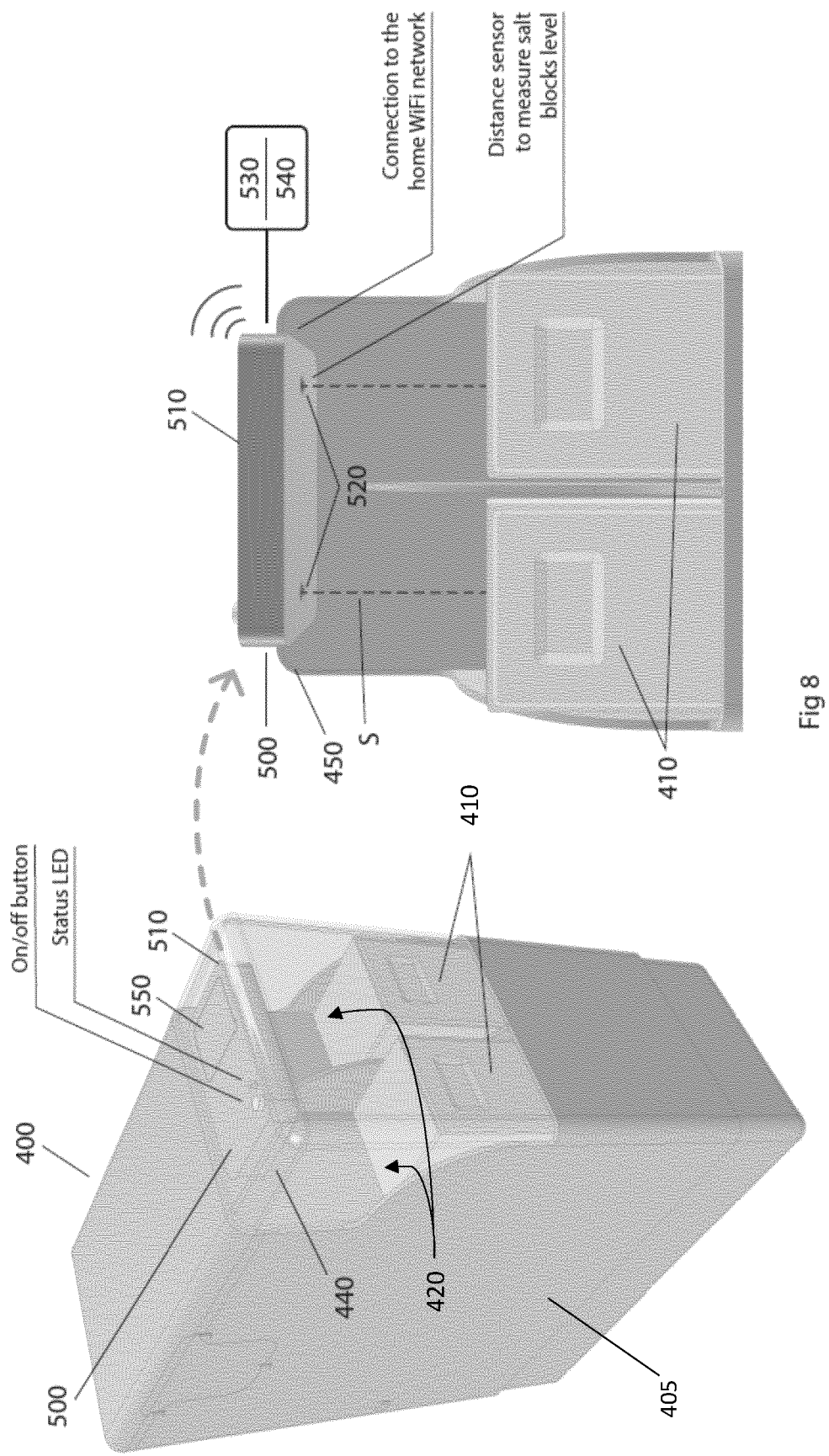
FIG. 8 is a view of one embodiment of a water softener apparatus according to the invention including a non-touch salt level indicator device according to the invention.

Specifically, the cross-section A comprises at least two sides 40, 50 substantially perpendicular to, but connected one at each end of the base line 20. The two sides 40, 50 connect with the functional side 30. Preferably, the functional side 30 comprises at least one inclined side relative to the base line 20 such as denoted by line 32 as shown in FIG. 2. Alternatively, the functional side 30 may comprises at least one curve line (FIGS. 5 & 8). The cross-section A may comprise an irregular polygon formed of a rectangular prism comprising the block portion and a truncated triangular prism comprising the extended portion. The block portion is that part of the salt block bounded by base side 20, perpendicular side 40, the part of perpendicular side 50 corresponding to side 40 and an imaginary side extending perpendicularly between the end of side 40 and a corresponding pint on side 50.

Figure 3:
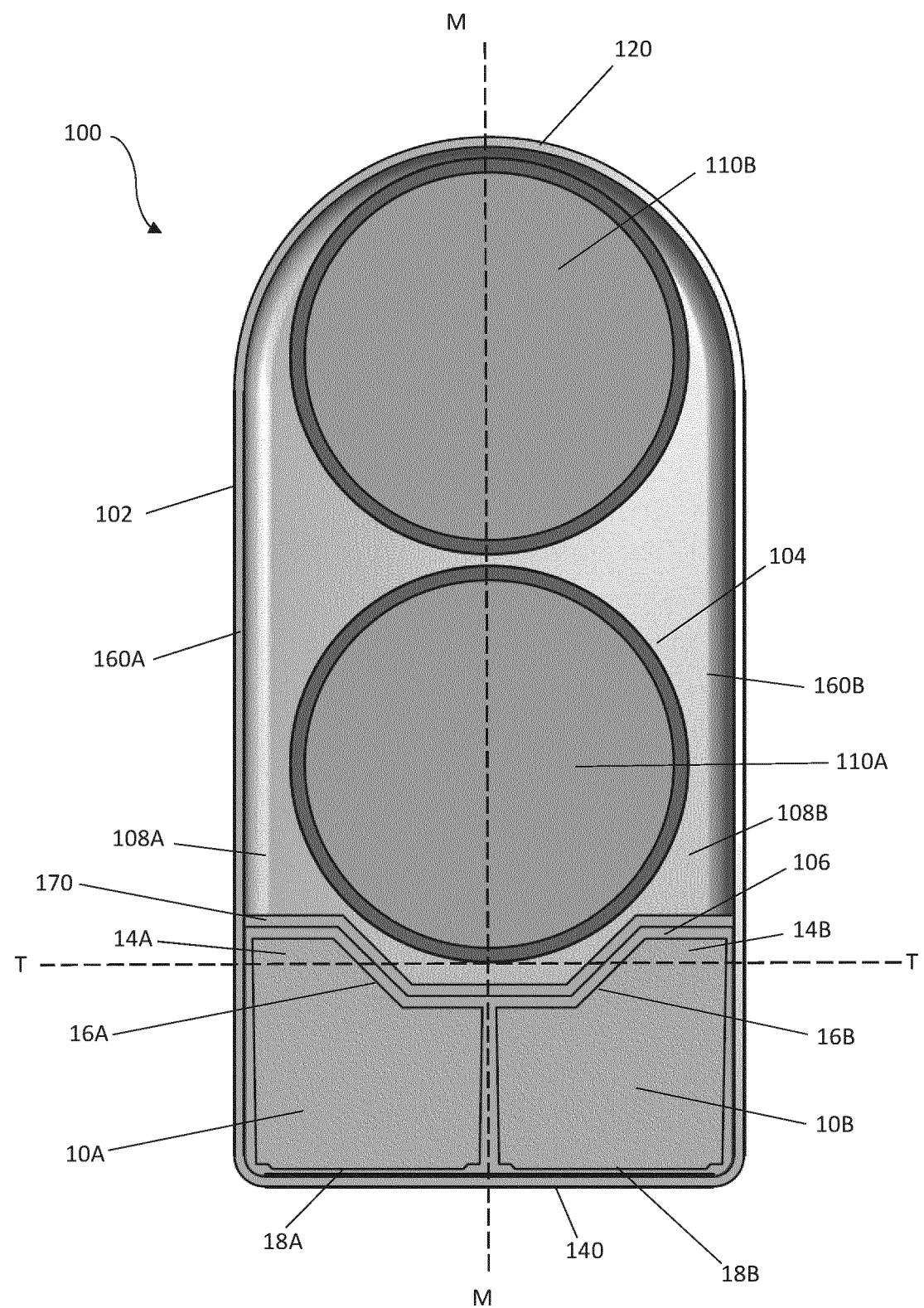
FIG. 3 is a cross sectional view showing a water softener apparatus with the compressed salt block of FIG. 1 provided therein.

As shown in FIG. 1, the functional side 30 extends along the length of the elongated body 12 to form a functional face or side 35. The functional face 35 of the salt block 10, in use, is adapted in one embodiment to be closely adjacent to or directly abut an exterior of a water softener tank 110A so as to position and hold the salt block 10 within the water softener apparatus 100. In another embodiment as shown in FIG. 3, the functional face 30 is adapted to abut a partition or wall of the water softener apparatus 100 so as to position and hold the salt block 10 within the water softener apparatus 100, where said partition or wall forms one boundary of the space defined by an external surface of the tank 110A and an inner wall surface of the housing adjacent the external surface of the tank 110A. Details of the water softener apparatus 100 and the arrangement of the salt block 10 therein are shown in FIG. 3, with the corresponding description as follows.

FIG. 3 shows a cross sectional view from above of an embodiment of the water softener apparatus 100 such as a water softener system or apparatus according to a first embodiment of the present invention. The water softener apparatus 100 of this and all embodiments of the invention are not electrically powered but are power water. The water regeneration and other operations of the water softener apparatus 100 are powered by the pressure of the main water supply connected to the apparatus 100.

The apparatus 100 comprises a housing 102 adapted to accommodate at least one water softener tank 110 and at least one compressed salt block 10. The housing 102 comprises a first space portion 104 for accommodating the at least one water softener tank 110 such as a water softening column, and a second space portion 106 for accommodating at least partially the at least one compressed salt block 10. The second space portion 106 can be considered as defining a chamber for accommodating said at least one compressed salt block 10. In this embodiment, the at least one compressed salt block 10 and the at least one water softener tank 110 are arranged vertically in parallel to a vertical axis of the housing 102.

In one embodiment, the housing 102 may comprise a substantially rounded end 120 at one side having the first space portion 104, and a substantially right-angled end 140 at the other side having the second space portion 106. The rounded end 120 and the right-angled end 140 are connected by two side walls 160A, 160B which extend in parallel to a virtual longitudinal mid-plane M-M of the housing 102, as shown in the figure.

Preferably, the housing 102 is configured to encase two cylindrical tanks 110A, 110B which align substantially vertically along the virtual mid-plane M-M in the first space portion 104; and two salt blocks 10A, 10B which are arranged one at each side of the virtual mid-plane M-M in the second space portion 106.

Although a preferred configuration of the housing 12 is illustrated and described, a person skilled in the art would appreciate that the housing should not be limited to the specific embodiment. Instead, housings of any suitable shapes and/or configurations should also be encompassed by the present invention, as long as they are adapted to accommodate one or more water softener tanks and one or more salt blocks as required by the present invention. Similarly, although it is illustrated in the figure that the water softener tank 100, as per the conventional water softening tank, is cylindrical in shape, it would be appreciated by the skilled person that water softener tank of any types and/or shapes should also be encompassed.

The compressed salt blocks 10A, 10B, as shown in FIG. 3, are positioned between at least one inner wall of the right-angled end 140 of the housing 102, and the water softener tank 110A. Specifically, the compressed salt blocks 10A, 10B each comprise a corresponding extension portion 14A or 14B which extends into a space 108A or 108B in the first space portion 104 between an external surface of the water softener tank 110A and an inner wall surface of the side walls 160A or 106B of the housing 102 adjacent the external surface of the tank 110A. More specifically, the extensions 14A, 14B each extend beyond an adjacent tangent T-T of the water softener tank 110A into the first space portion 104, with the adjacent tangent T-T being substantially perpendicular to the longitudinal mid-plane M-M of the housing 102.

Preferably, the extension 14 can be configured to taper towards the space 108 in the first space portion 104. More preferably, the extension 14 may comprise at least one stopping surface 16 facing the tank 110A for restricting movement of the compressed salt block 10 within the housing 102.

The extending of the extensions 14A, 14B into the corresponding spaces 108A, 108B are advantageous in that it helps maximize the use of space within the housing 102 and particularly, the use of void spaces between the curvature of the tank 110A and the housing 102. This allows more salt to be loaded into the same apparatus 100. In addition, the stopping surface 16, which is formed by extending the side 32 of the cross-section A along the longitudinal body 12, is adapted to lean against the exterior of the tank 110A when, for example, the apparatus 100 is tilted or when the salt block 10 descends towards the bottom of the housing 102 over time as it erodes. The salt blocks 10 are allowed to stay upright within the housing 102, without tipping over the side walls 106 of the housing 102 or touching each other where they may subsequently fuse to form salt bridges. Because of this, no divider or dividing wall is required to be arranged between the two salt blocks 10A, 10B to separate the two blocks from jamming, which further assists in maximizing the use of space within the housing 102, i.e., no dividing wall is required between the salt blocks along line M-M.

In the embodiment as shown in the figure, the stopping surface 16 comprises at least one inclined surface. Alternatively or additionally, the stopping surface 16 may also comprise at least one curved surface, preferably comprising an inwardly curved surface with respect to the salt block.

The compressed salt block 10 may also comprise at least one positioning surface 18 opposing the stopping surface 16. The positioning surface 18 is adapted to abut at least one inner wall of the right-angled end 140 of the housing 102 so as to position the compressed salt block 10 in the second space portion 106.

Preferably, the compressed salt block 10 is configured in the shape of a prism, and more preferably, a polygonal prism as shown in FIG. 1.

In one embodiment the water softener apparatus 100 may further comprise a partition 170 between the compressed salt blocks 10A, 10B and the cylindrical tank 110A. The partition 170 is arranged with at least one aperture (not shown) to allow fluid communication between the first and the second space portions 104, 106. Preferably, the stopping surface 16 of the compressed salt block 10 is configured to substantially conform with the shape of the partition 170, and the shape of the partition 170 is configured to substantially conform with the curvature of the corresponding portion of the tank 110A.

Figure 4:
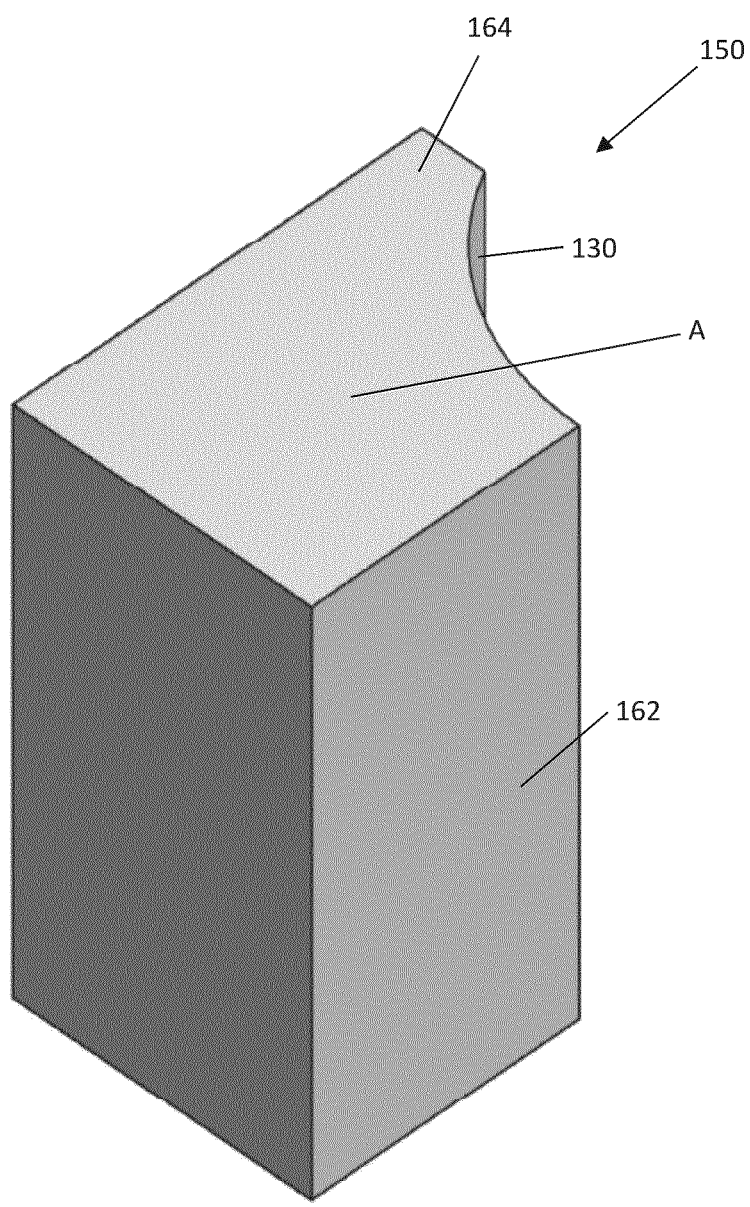
FIG. 4 is a perspective view showing a compressed salt block according to a second embodiment.

FIG. 4 shows a compressed salt block 150 in accordance with another embodiment. In like manner to FIG. 1, the compressed salt block 150 is configured to comprise a first main block portion and a second extension portion. As shown in the figure, the compressed salt block 150 comprises an elongated body 162 having an irregular cross section A. Reference to the cross-section A illustrates that the extension portion 164 is partly defined by a curved functional side or face 130 where, by contrast, the embodiment of FIG. 1 has an indented or inclined flat face 30.

As shown in FIG. 5, a leading end of the curved portion 130a of the functional side 130 forms an acute angle α to a base line 120 thereby forming the extended portion 164 of the cross-section A.

The functional face 130 of the salt block 150, in use, is adapted to be closely adjacent to or directly abut a curved exterior surface of a water softener tank 210 (FIG. 6) so as to position and hold the salt block 150 within a water softener apparatus 200. In this embodiment as particularly shown in FIG. 6, there is no requirement for an internal partition or wall within the water softener apparatus 200 for positioning or holding the salt block 150, although a curved partition or wall could be provided in some embodiments to prevent the salt block 150 resting against the exterior surface of the water softener tank 210.

Figure 6:
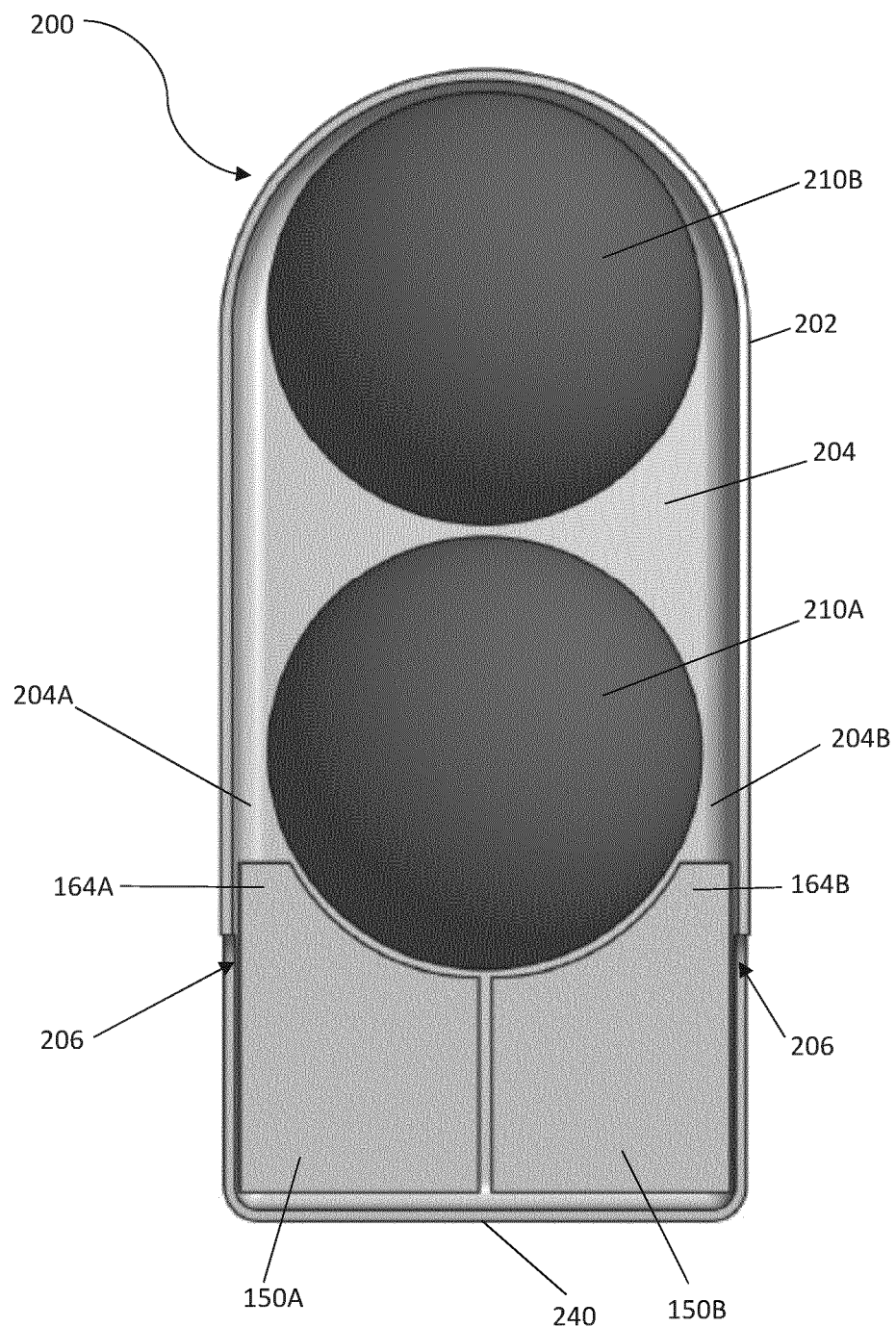
FIG. 6 is a cross sectional view showing a water softener apparatus with the compressed salt block of FIG. 4 provided therein.

FIG. 6 shows a cross sectional view of a water softener apparatus 200 such as a water softener system or apparatus according to a second embodiment of the present invention. The apparatus 200 comprises a housing 202 adapted to accommodate at least one water softener tank 210A,B and at least one compressed salt block 150A,B. The housing 202 comprises a first space portion 204 for accommodating the at least one water softener tank 210A,B such as a water softening column, and a second space portion 206 for accommodating at least partially the at least one compressed salt block 150A,B. The second space portion 206 can be considered as defining one or more chambers for accommodating said at least one compressed salt block 150A,B.

Preferably, the housing 202 is configured to encase two cylindrical tanks 210A, 210B which align substantially vertically along a mid-plane of the first space portion 204; and two salt blocks 150A, 150B which are arranged one at each side of the mid-plane in the second space portion 206.

The compressed salt blocks 150A, 150B, as shown in FIG. 6, are positioned between at least one inner wall of a right-angled end 240 of the housing 202, and the water softener tank 210A. Specifically, the compressed salt blocks 150A, 150B each comprise a corresponding extension 164A, 164B which extends into a space 204A or 204B in the first space portion 204.

Figure 7:
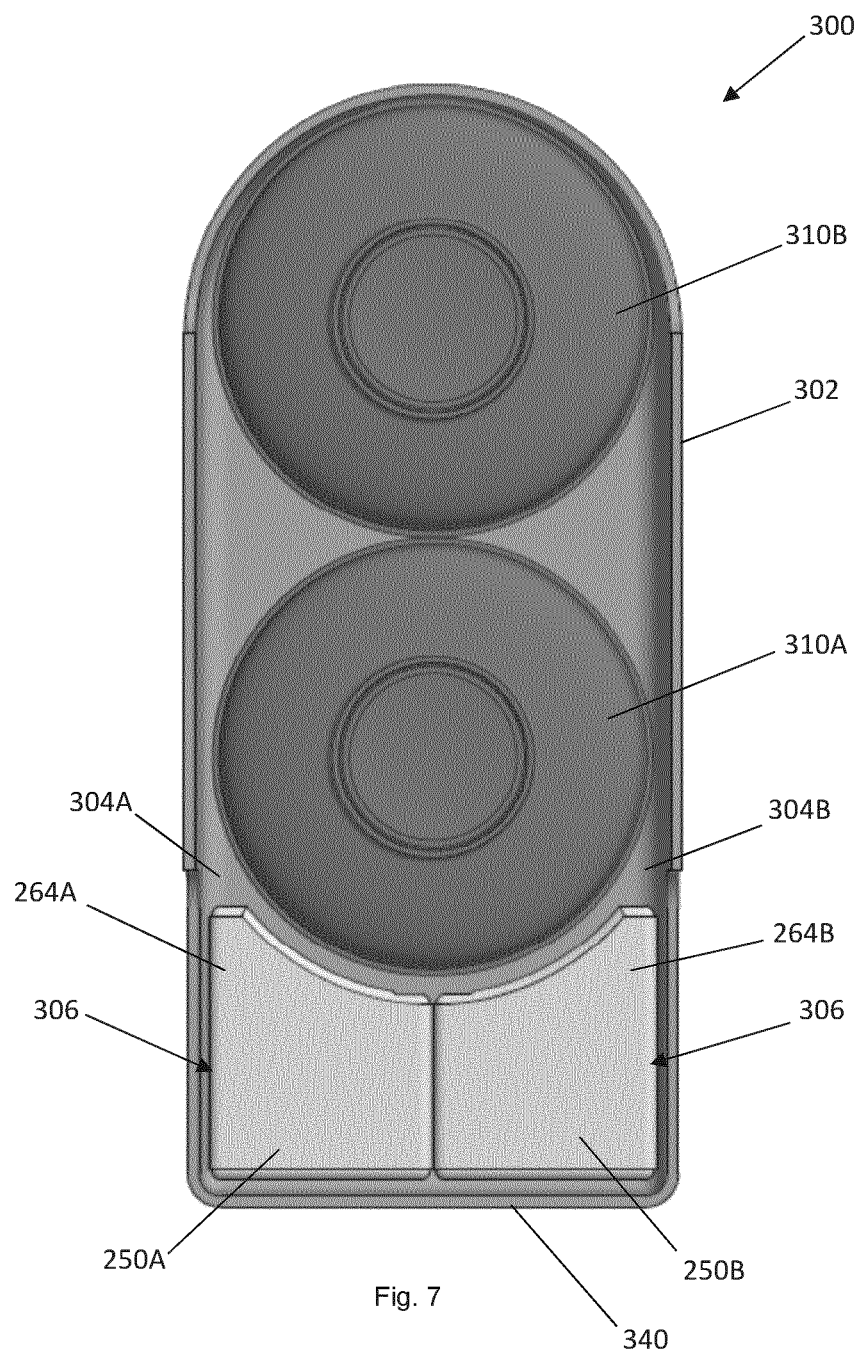
FIG. 7 is a cross sectional view showing a water softener apparatus with the compressed salt block provided therein.

FIG. 7 shows a cross sectional view of a water softener apparatus 300 such as a water softener system or apparatus according to another embodiment of the present invention. The apparatus 300 comprises a housing 302 adapted to accommodate at least one water softener tank 310A,B and at least one compressed salt block 250A,B of any of the foregoing salt block embodiments. The housing 302 comprises a first space portion 304 for accommodating the at least one water softener tank 310A,B such as a water softening column, and a second space portion 306 for accommodating at least partially the at least one compressed salt block 250A,B. The second space portion 306 can be considered as defining one or more chambers for accommodating said at least one compressed salt block 250A,B.

Preferably, the housing 302 is configured to encase two cylindrical tanks 310A, 310B which align substantially vertically along a mid-plane of the first space portion 304; and two salt blocks 250A, 250B which are arranged one at each side of the mid-plane in the second space portion 306.

The compressed salt blocks 250A, 250B, as shown in FIG. 7, are positioned between at least one inner wall of a right-angled end 340 of the housing 302, and the water softener tank 310A. Specifically, the compressed salt blocks 250A, 250B each comprise a corresponding extension 264A, 264B which extends into a space 304A or 304B in the first space portion 304.

The reference to "functional side" of the salt block in all embodiments is a reference to the fact that this side or face of the salt block functions to support the salt block in an upright position when inserted into a water treatment apparatus. The inclined or curved functional side or face abuts a surface to maintain the upright posture of the salt block as it slowly erodes to provide the brine solution in the water treatment apparatus.

The compressed salt block and the use of the compressed salt block in a water softening apparatus of the present invention is advantageous in that it significantly maximizes the use of space within the housing of the apparatus. Particularly, the extensions of the salt blocks are capable of taking up the void spaces between the curvature of the water softening tank and the housing. This allows more salt to become available in the same apparatus and/or for the apparatus as a whole to be made smaller. In addition, the extension provides a stopping surface which is adapted to lean against the exterior of the cylindrical tank or a conforming wall when, for example, the apparatus is tilted upon movement or when the salt block descends towards the bottom of the housing over time. This arrangement assists in keeping the salt blocks upright within the housing without tipping towards the side walls 106 of the housing 102 or fusing with each other to form salt bridges between the two blocks. No block divider is thus required to separate the two blocks which further assists in maximizing the use of space within the apparatus.

FIG. 8 shows yet a further embodiment of a water softener apparatus 400 according to the invention by way of illustrating how any of the water softener apparatus embodiments of any of FIG. 3, 6, 7 or 8 itself may be adapted to accommodate a non-touch salt level indicator device 500 for determining a salt level from an upper end face of a compressed salt block 410 accommodated in a chamber 420 of the water softener apparatus 400.

The non-touch salt level indicator device 500 is preferably a battery-operated device and is preferably a low power, battery-operated device and/or preferably a long-life solid-state device. In one embodiment, the non-touch salt level indicator device 500 is powered by four AA or AAA standard batteries which is expected to provide one to two years of operation before the batteries need to be replaced.

In another embodiment of the non-touch salt level indicator device 500, the device may have a mains power lead to supply power to the device 500, or to provide power to a trickle battery charger where the batteries used in the device 500 are rechargeable batteries.

In all arrangements of the non-touch salt level indicator device 500, it is envisaged that the water softener apparatus will comprise a non-electric powered water softener apparatus in view of the advantages provided by such a water softener apparatus over electrically powered water softener apparatuses.

The non-touch salt level indicator device 500 comprises a housing 510 and at least one sensor 520 for radiating a signal towards a horizontal upper end face of a compressed salt block 410 placed in a chamber 420 of the water softener apparatus 400 in order to reflect said signal off said horizontal upper end face, to detect the reflected signal, and to determine a distance from the sensor 520 to said upper end face from a round-trip time of the reflected signal. The housing 510 of the non-touch salt level indicator device 500 may, in use, be freely supported on a housing part 440 of the water softener apparatus 400 in any suitable position above one or more chambers 420 of the water softener apparatus such that a respective signal S radiates from the sensor 520 in a direction substantially normal to the horizontal end face of the compressed salt block 410 placed in one of the chambers 420 of the water softener apparatus 400. The housing part 440 of the water softener apparatus 400 comprises a front cover 440 of a main housing 405 of the water softener apparatus 400. The front cover 440 when placed on the main housing 405 encloses the chambers 420. The front cover 440 is manually detachable from the main housing 405. The front cover 440 is preferably formed from a transparent plastics material. Alternatively, the housing 510 of the non-touch salt level indicator device 500 may be adapted to be manually attachable and detachable from a wall 450 of the main housing 405, although it will be understood by one skilled in the art that any means of supporting the non-touch salt level indicator device 500 in any suitable position above the one or more chambers 420 of the water softener apparatus housing 405 is envisaged as being within the scope of the invention.

The one or more sensors 520 preferably comprise infrared sensors because such light is highly reflective off the smooth, white compressed end surfaces of the salt blocks 410. This improves reflection efficiency resulting in a more accurate reading yet can be achieved with a low power signal. On a first use of the non-touch salt level indicator device 500, a calibration step may be performed to determine a distance from the sensor to the horizontal upper end face of a new salt block 410 placed in one of the chambers 420. Once this distance is known, it can, in effect, be set to zero by being discounted from a distance determined by a round-trip time of the radiated signal from the sensor 520. Such a calibration step can be performed each time a replacement new salt block is placed in one of the chambers 420, although this is not essential to the functioning of the non-touch salt level indicator device 500. Over time, as a lower end of the salt block dissolves to form brine, the salt block drops under the influence of gravity deeper into the chamber 420. Consequently, the distance measured from the sensor 510 to the upper end face of the salt block 410 increases and, with prior knowledge of the length of the salt block 410, the non-touch salt level indicator device 500 can determine an amount of the salt block remaining and thus provide an indication of the salt level within the chamber 420. The indication of the salt level within the chamber 420 can be provided as a percentage amount constituted by the remaining part of the salt block 410 in the chamber 420 or as a calculated or determined time period until said salt block is depleted and a new salt block needs to be placed in the chamber 420. In this latter case, the calculated or determined time period until depletion of the current salt block 410 in the chamber 420 may be calculated from data relating to a determined rate of drop in the salt level over time and the calculated amount or proportion of the current salt block 410 remaining in the chamber 420.

The non-touch salt level indicator device 500 may include a processor 530 and a memory 540 storing machine code instructions for implementing operations of the non-touch salt level indicator device 500 as described herein.

Whilst FIG. 8 illustrates the non-touch salt level indicator device 500 in use with compressed salt blocks 410 of a regular horizontal cross-section compared to the preferred salt block embodiments of FIGS. 1 and 4, it will be understood that the non-touch salt level indicator device 500 is not limited to use with regular horizontal cross-section compressed salt blocks 410 as shown in FIG. 8. In fact, there are significant and unexpected advantages to using the non-touch salt level indicator device 500 in the water softener apparatus embodiments of FIGS. 5, 6 and 7 with the salt block embodiments of FIGS. 1 and 4. This is because said salt blocks having a non-regular horizontal cross-section are being supported within the chambers of the water softener apparatus embodiments of FIGS. 5, 6 and 7 in a more upright manner that may be the case for regular horizontal cross-section salt blocks which increases the accuracy of the salt level determination as the upper end faces of said salt blocks tend to remain more substantially horizontally, i.e. less affected by tilting, than the regular cross-sectional salt blocks.

The non-touch salt level indicator device 500 preferably includes a battery compartment 550 for receiving replacement batteries. It may also include an audible buzzer and/or flashing light 560 to locally alert a user to a low salt level condition or to another operational condition of the water softener apparatus 400.

Figure 9:
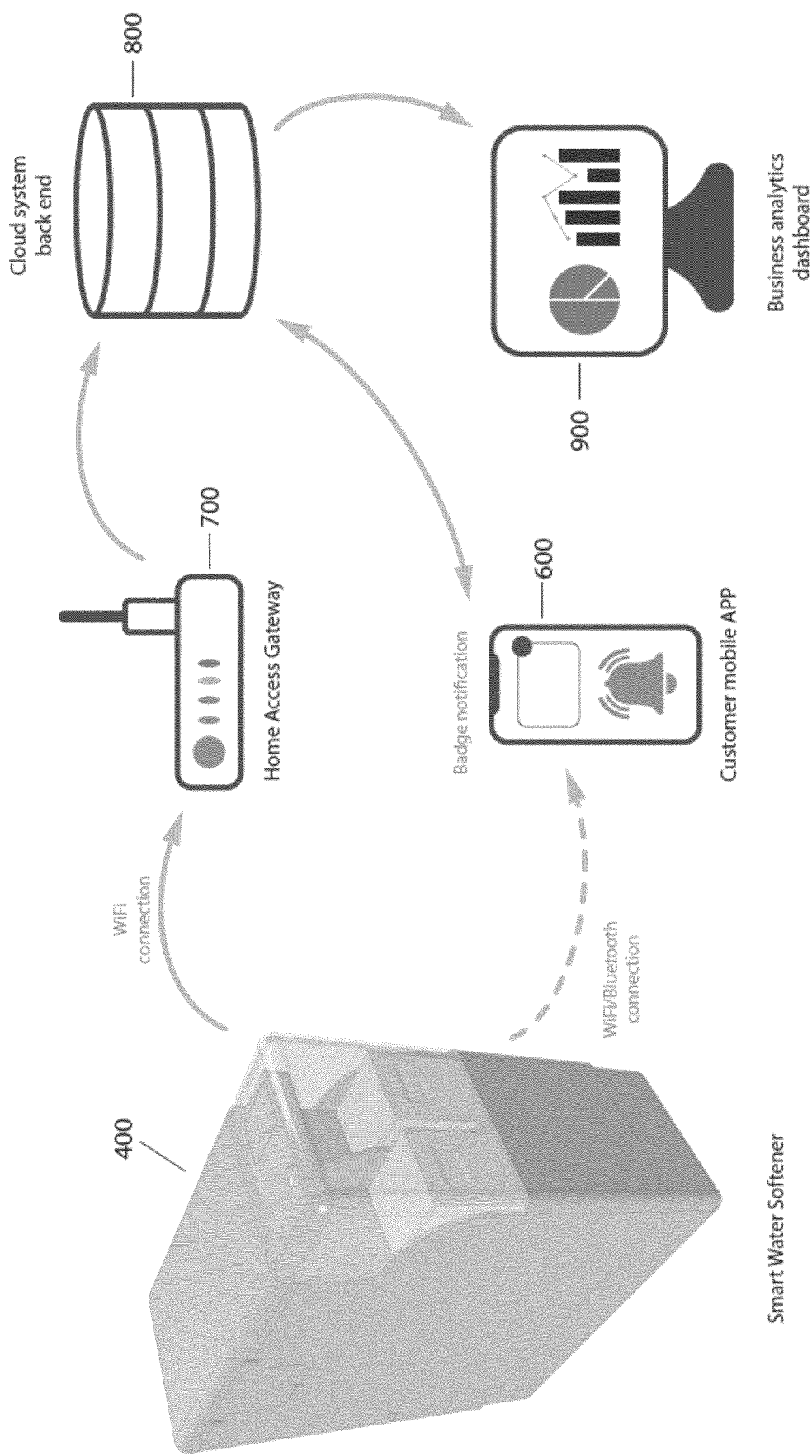
FIG. 9 shows a network connected embodiment of a water softener apparatus according to the invention including a non-touch salt level indicator device according to the invention.

As shown in both FIGS. 8 and 9, the non-touch salt level indicator device 500 is preferably WiFi™ and/or BlueTooth™ enabled to enable said device 500 to communicate electronically with a user's mobile handset or other computing device 600 and/or a home access gateway 700 or the like. Furthermore, the non-touch salt level indicator device 500 may be enabled, either directly or via the user's mobile handset or other computing device 600 and/or the home access gateway 700, to communicate with a back-end cloud-based system 800 and/or with a business analytics dashboard 900.

The non-touch salt level indicator device 500 may alert a user by text, email, or an app notification when it is time to replace one or more of the compressed salt blocks 410. The alert will also allow the customer to order salt blocks and the alert may preferably initiate the ordering process on the user's mobile handset or other computing device 600 through a suitable app downloaded to the user's mobile handset or other computing device 600.

In addition to monitoring salt levels in the one or more chambers 420, the non-touch salt level indicator device 500 may be configured to detect and alert for water leaks in the water softener apparatus 400, relay water softener apparatus diagnostic data to the back-end cloud-based system 800 and/or the business analytics dashboard 900, monitor and alert on water quality, and monito and alert on water softener apparatus parts statuses and wear.

Figure 10:
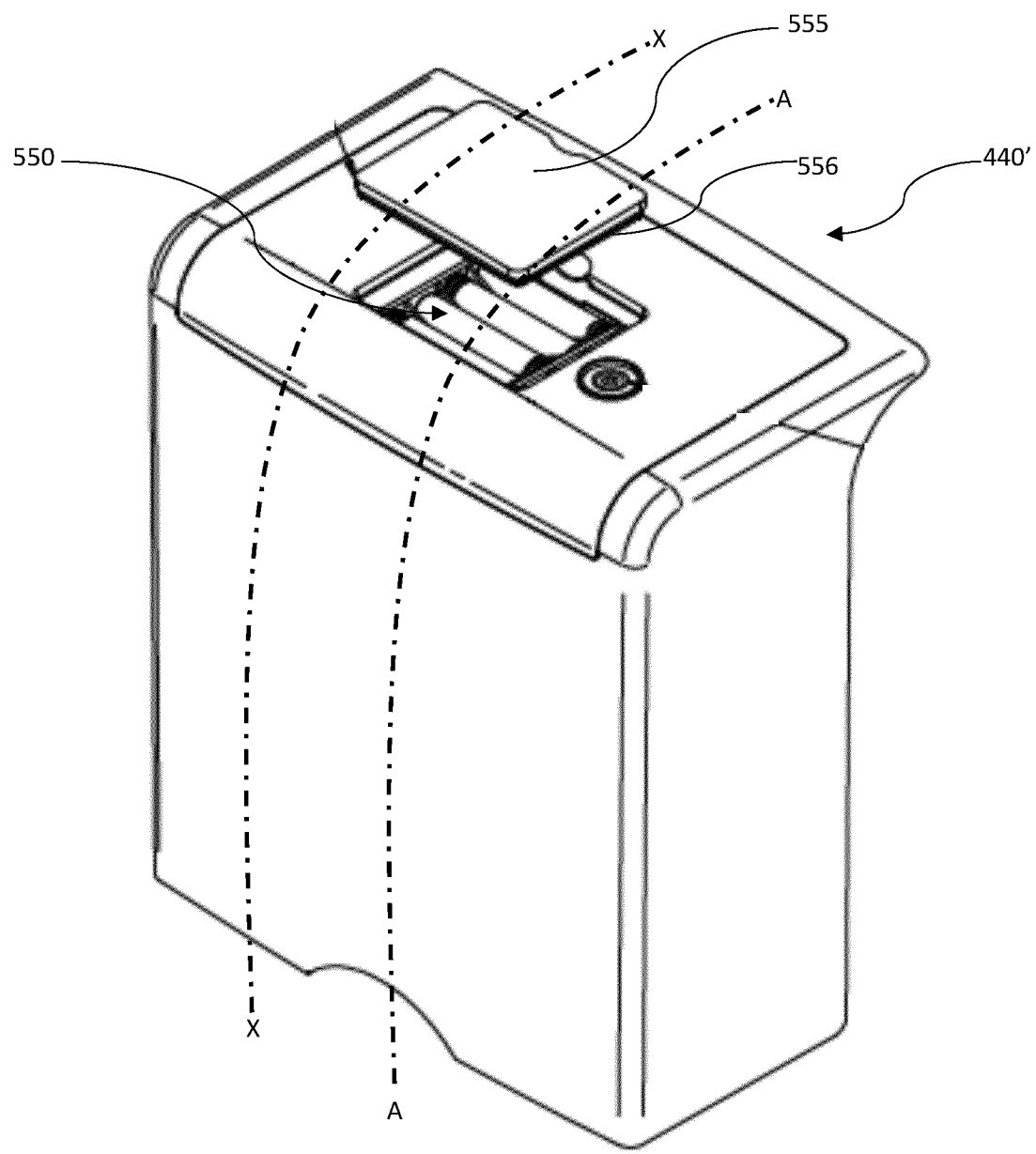
FIG. 10 is a perspective view of a front cover for the water softener apparatus of FIG. 8.

FIG. 10 provides a perspective view of another embodiment of a front cover 440' for the water softener apparatus 400. It will be appreciated that the overall form or shape of the front cover 440' of FIG. 10 does not correspond exactly to that of the front cover 440 of FIGS. 8 and 9, but the purpose and function of the front cover 440' is fully applicable to the water softener apparatus 400 of FIGS. 8 and 9 when the front cover 440 shown in FIGS. 8 and 9 is modified in accordance with the modifications described for the front cover 440'.

The front cover 440' is, in use, manually detachable from the main housing 405 of the water softener apparatus 400 and, when placed on the main housing 405, encloses the chambers 420. The front cover 440' is also preferably formed from a transparent plastics material.

Figure 11:
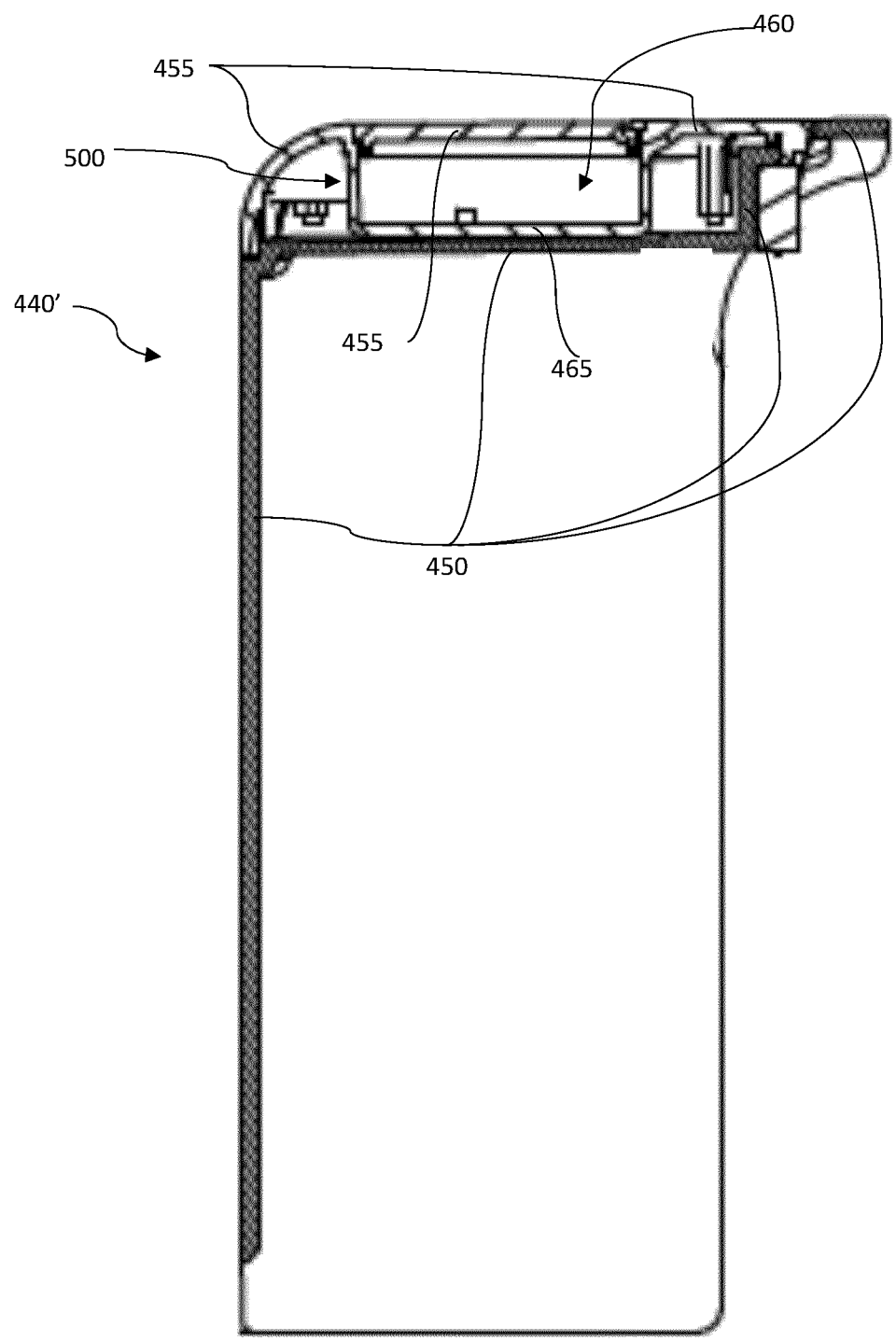
FIG. 11 is a side-sectional view of the front cover of FIG. 10 along line A-A.
Figure 12:
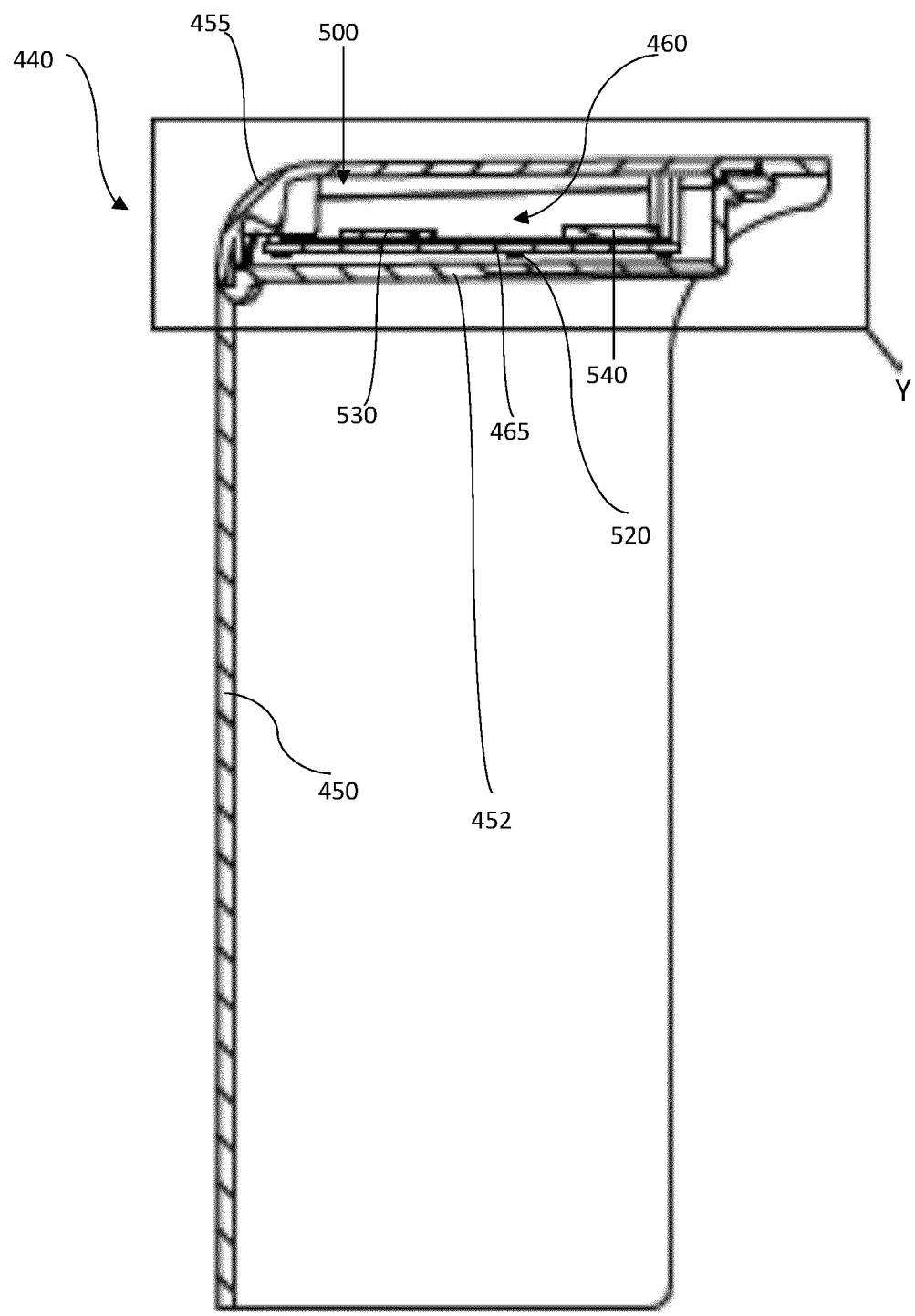
FIG. 12 is a side-sectional view of the front cover of FIG. 10 along line X-X.

The front cover 440' is arranged such that the housing 510 of the non-touch salt level indicator device 500 is mounted within or defined by a top portion of the front cover 440' as can be better seen in FIGS. 11 and 12. The battery compartment 550 of the housing 510 is accessible from the exterior of the front cover 440'. A lid 555 of the battery compartment 550 is manually detachable from the exterior of the front cover 440'. The lid 555 is provided with an O-ring seal 556 to seal the battery compartment 550 and prevent water ingress to said battery compartment 550. An advantage of arranging access to the battery compartment 550 from an exterior of the front cover 440' is that, when the batteries need replacing, a user can remove the front cover 440' from the main housing 405 and replace the batteries away from the water softener apparatus 400 thereby preventing batteries being accidentally dropped into the apparatus 400 and, more particularly, into brine in the bottom of the chambers 420. Furthermore, as the water softener apparatus is often installed within cupboards or other difficult to access areas, being able to remove the front cover 440' with the non-touch salt level indicator device 500 allows a user to replace the batteries in the battery compartment 550 at a more convenient location with better lighting and with better access to the battery compartment 550.

Referring to FIG. 11 which provides a side-sectional view of the front cover 440' of FIG. 10 along line A-A, it can be seen that the front cover 440' is formed from a continuously molded first member 450 which, when the front cover 440' is placed on the main housing 405, separates the housing 510 of the non-touch salt level indicator device 500 from the chambers 420 thereby protecting said non-touch salt level indicator device 500 and any components contained in its housing 510, such as the processor 530 and the memory 540, from the salty environment of the chambers 420 which is corrosive. The continuously molded first member 450 prevents or reduces exposure of the non-touch salt level indicator device 500 to the corrosive salt environment of the chamber 420. A top portion of the front cover 440' is formed from a second molded member 455 to define a device chamber 460 to accommodate the non-touch salt level indicator device 500 such that the lid 555 of the battery compartment 550 is preferably flush with a top surface of the front cover 440'.

Figure 13:
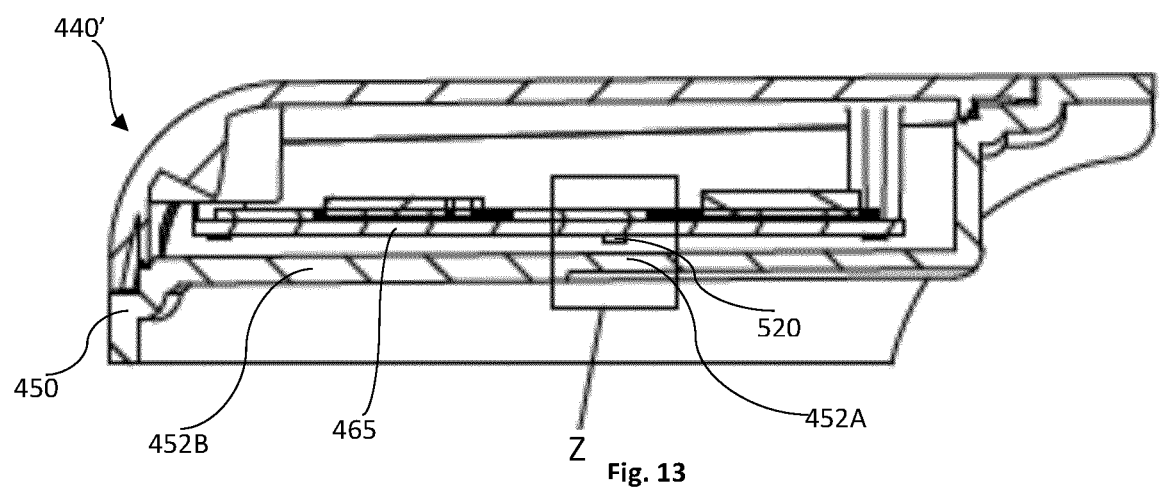
FIG. 13 is an enlarged side sectional view of section Y of FIG. 12.

Referring to FIG. 12 which provides a side-sectional view of the front cover 440' of FIG. 10 along line X-X, it can be seen that a bottom wall 465 of the device chamber 460 is spaced above a top wall 452 of the continuously molded first member 450 such that the at least one sensor 520 of the non-touch salt level indicator device 500 is spaced above said top wall 452, said at least one sensor 520 also being separated from the chambers 420 by the continuously molded first member 450. As such, the at least one sensor 520 is arranged to determine the salt level from the upper end face of the compressed salt block 410 in the chamber 420 through said top wall 452 of the continuously molded first member 450. This can be seen better in FIGS. 13 and 14. FIG. 13 provides an enlarged side sectional view of section Y of FIG. 12 and FIG. 14 provides a further enlarged side sectional view of section Z of FIG. 13.

Figure 14:
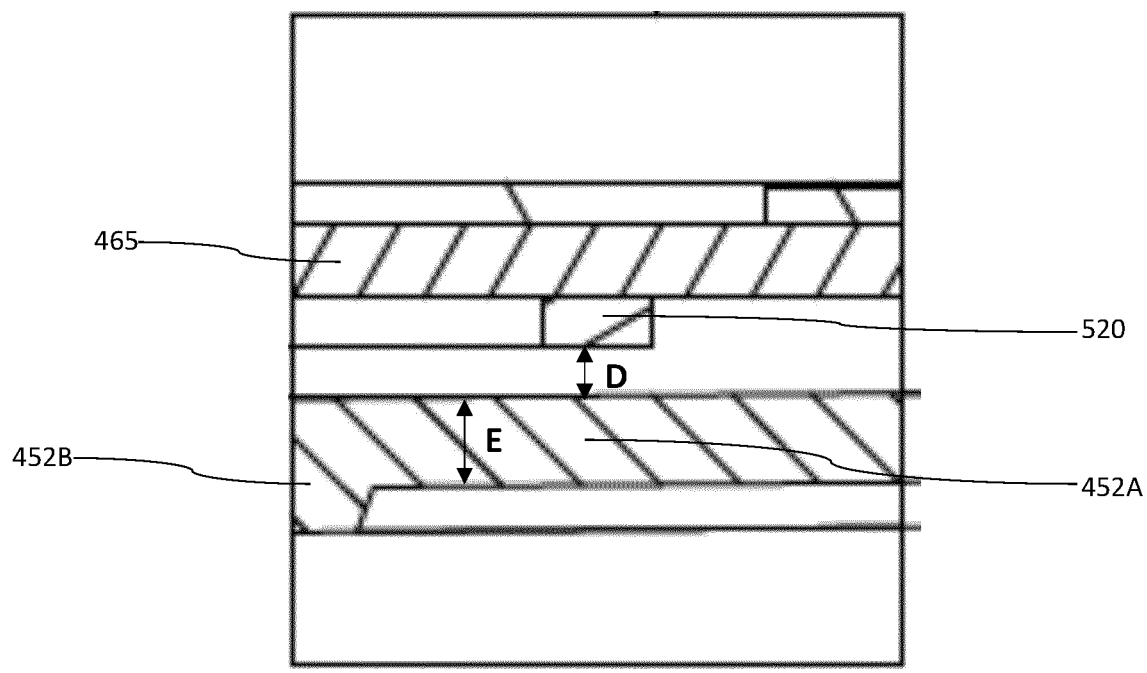
FIG. 14 is a further enlarged side sectional view of section Z of FIG. 13.

In the described arrangement of FIGS. 10 to 14, the sensor 520 is protected from the salty environment of the chambers 420. However, the sensor 520 has to make its salt level measurements through the top wall 452 of the continuously molded first member 450. It has been found that to enable the sensor 520 to function at an acceptable level of accuracy, it is preferred that the sensor 520 is spaced no more and preferably less than 1 mm above the top surface of the top wall 452; D in FIG. 14 is not more that, but preferably less than 1 mm. Furthermore, it is preferred that a portion 452A of the top wall 452 through which the signal emitted by the sensor 520 must pass is made thinner than other portions 452B of the top wall 452. It is preferred that the portion 452A of the top wall 452 is made no more and preferably less than 2 mm in thickness compared to a preferred thickness of 3 mm for the other portions 452B of the top wall 452; E in FIG. 14 is not more than, but preferably less than 2 mm. A suitable sensor for this function is the "Time of Flight Ranging & Gesture detection Sensor" from STMicroElectronics.

The front cover 440' may be detachably retained on the main housing 405 by one or more magnetic elements.

Figure 15:
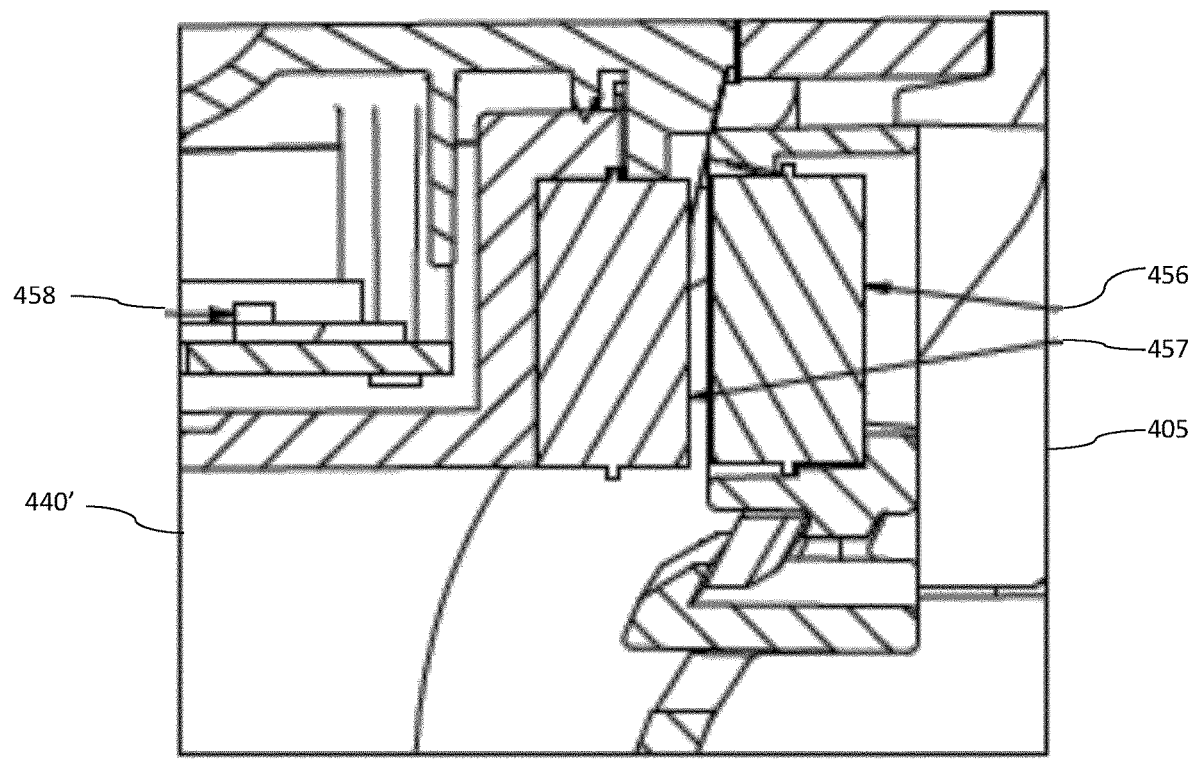
FIG. 15 is an enlarged side sectional view of back edge of the front cover where it abuts the water softener housing in use.

FIG. 15 provides an enlarged side sectional view of a back edge of the front cover 440' where it abuts the main housing 405 in use. A first magnetic element 456 is provided on the main housing 405 near said back edge of the front cover 440'. A metal plate 457 is provided at said back edge on the front cover 440' such that said first magnetic element 456 provided on the main housing 405 retains the front cover 440' in position on the main housing 405 by magnetic attraction of the metal plate 457. A proximity sensor 458 is provided on the front cover 440' to detect when the front cover 440' is detached from the main housing 405 and is when it is returned to the main housing 405. The proximity sensor 458 may be arranged to trigger the non-touch salt level indicator device 500 to make a new salt level determination when the front cover 440' is placed back on the main housing 405. The proximity sensor 458 may be arranged to trigger the non-touch salt level indicator device 500 to communicate said new salt level determination to a user's handheld device or computing device 600.

In FIG. 15, the proximity sensor 458 preferably comprises a hall effect sensor 458 mounted in or on the front cover 440' and positioned close to the magnetic element 456 positioned on the main housing 405 such that, when the front cover 440' is removed from the main housing 405, the hall effect sensor 458 detects the decrease in magnetic flux from the magnetic element 456 and thereby detects detachment of the front cover 440' from the main housing 405. Conversely, the hall effect sensor 458 detects the increase of magnetic flux when the front cover 440' is replaced on the main housing 405 and thereby detects return of the front cover 440' to the main housing 405. One advantage of the proximity sensor 458 in triggering the non-touch salt level indicator device 500 to communicate said new salt level determination to a user's handheld device or computing device 600 when the front cover 440' is replaced on the main housing 405 is that the user is immediately updated with the new salt level measurement if only one chamber 420 is provided or measurements if two or more chambers 420 are provided.

The processor 530 may be configured to send an alert to a user's handheld device or computing device 600 if the front cover 440' is not replaced on the main housing 405 within a predetermined period of time and/or if the front cover 440' is detected as not having been correctly positioned on the main housing 405.

Preferably, prior to first use, battery replacement, and/or after insertion of a new salt block 410 in the chamber 420, the non-touch salt level indicator device 500 is calibrated by triggering the non-touch salt level indicator device 500 to take at least two calibration distance measurements. The at least two calibration distance measurements may comprise minimum and maximum salt level measurements. The maximum salt level measurement preferably corresponds to a new salt block 410 being accommodated in the chamber 420 whereas the minimum salt level measurement corresponds to no salt block 410 being accommodated in the chamber 420. The minimum and maximum salt level measurements are stored in the memory 540 and the processor 530 is configured to make suitable adjustments to subsequent salt level measurements based on calibration data derived from said minimum and maximum salt level measurements. The minimum salt level calibration measurement may be taken from a surface of a normal level of water/brine in the bottom of the chamber 420 as it has been found that this improves the subsequent calibrated results. Taking at least two calibration distance measurements has been found to mitigate measurements errors which may arise from cross-talk of the time of flight signal when it passes through the top wall 452 and, more specifically, when small portions of the signal energy are reflected to the sensor 520 by the external and/or internal surfaces of the top wall 452 at the point where the signal emitted by the sensor 520 passes through said top wall 452.

The invention also provides a water softener apparatus comprising: a housing, said housing having a chamber for accommodating salt; a manually detachable front cover enclosing the chamber; and a non-touch salt level indicator device arranged in or on said manually detachable front cover of the housing above the chamber so as to determine a salt level from an upper surface of the salt accommodated in the chamber, the non-touch salt level indicator device determining the salt level from the upper surface of the salt through a wall of said front cover of the housing.

Whilst the thrust of the invention relates to determining a slat level in a water softener apparatus of the type configured to use large compressed slat blocks, it will be apricated that the principles of the invention can be utilized in a water softener apparatus of the type using loose salt in the form of tablets or granules where the salt level measurement is determined from a top surface of the loose salt in the apparatus salt chamber with the non-touch salt level indicator device being arranged above a wall of the front cover separating the with the non-touch salt level indicator device from the chamber to thereby prevent or reduce exposure of the non-touch salt level indicator device to the corrosive salt environment of the chamber.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A water softener apparatus comprising:
a housing, said housing having a chamber for accommodating at least one compressed salt block, the compressed salt block having a weight in a range of 1 kg to 6 kg and having an elongate block form comprising vertical walls, a horizontal upper end face and a horizontal lower end face, the chamber conformed to the longitudinal external shape of the compressed salt block for insertion of the compressed salt block longitudinally into the chamber, the configuration being such that the compressed salt block is supported within said chamber with its longitudinal axis in a vertical orientation;
a manually detachable front cover enclosing the chamber; and
a battery operated non-touch salt level indicator device comprising a housing and a time of flight sensor, said non-touch salt level indicator device housing mounted in or on said manually detachable front cover of the housing above the chamber such that the time of flight sensor is spaced above a top surface of a continuous wall section of said front cover of the water softener apparatus housing, the non-touch salt level indicator device measuring a salt level in the chamber from the horizontal upper end face of the compressed salt block supported in the chamber, the non-touch salt level indicator device determining the salt level by reflecting a signal emitted by the time of flight sensor off the horizontal upper end face of the compressed salt block and by determining a round-trip time of the reflected signal, said sensor being spaced above the top surface of the continuous wall section such that the emitted signal passes through a thickness of said continuous wall section of said front cover of the housing, wherein the housing of the non-touch salt level indicator device is separated from the chamber by the continuous wall section of the front cover.

2. The water softener apparatus of claim 1, wherein a portion of the continuous wall section of the front cover through which the time of flight signal passes when emitted into the chamber to reflect off the upper end face of the compressed salt block is thinner than remaining portions of the continuous wall section of the front cover.

3. The water softener apparatus of claim 2, wherein the time-of-flight sensor is positioned at 1 mm or less from a top surface of the thinned portion of the continuous wall section and/or the thinned portion of the continuous wall section is 2 mm or less in thickness.

4. The water softener apparatus of claim 1, wherein a battery compartment of the non-touch salt level indicator device is accessible from a top external wall of the front cover of the housing.

5. The water softener apparatus of claim 1, wherein a top external wall of the front cover is spaced above the continuous wall section of the front cover so as to define a chamber for accommodating the non-touch salt level indicator device above the top surface of said continuous wall section and/or the front cover is detachably retained on the housing by one or more magnetic elements.

6. The water softener apparatus of claim 1, wherein it includes a proximity sensor for detecting when the front cover has been removed from the housing and/or when the front cover has been placed back on the housing.

7. The water softener apparatus of claim 6, wherein the proximity sensor triggers the non-touch salt level indicator device to make a new measurement of the level of salt in the chamber when the front cover is placed back on the housing.

8. The water softener apparatus of claim 1, wherein the non-touch salt level indicator device comprises a processor and a memory storing machine readable instructions which, when executed by the processor, cause the non-touch salt level indicator device to measure a level of the compressed salt block within the chamber.

9. The water softener apparatus of claim 8, wherein the processor of the non-touch salt level indicator device calibrates salt level measurements made by said non-touch salt level indicator device by triggering the non-touch salt level indicator device to take minimum and maximum salt level distance measurements, the minimum salt level distance measurement corresponding to a new salt block being accommodated in the chamber and the maximum salt level distance measurement corresponding to no salt block being accommodated in the chamber, the processor being configured to store said minimum and maximum salt level distance measurements in the memory and to make suitable adjustments to subsequent salt level distance measurements based on calibration data derived from said minimum and maximum salt level distance measurements.

10. The water softener apparatus of claim 9, wherein the processor causes the non-touch salt level indicator device to make the maximum salt level distance calibration measurement from a surface of a level of water in the bottom of the chamber.

11. The water softener apparatus of claim 1, wherein the non-touch salt level indicator device is a standalone device configured to latch onto, be inserted in or otherwise be supported by the front cover of the housing or the non-touch salt level indicator device housing is freely supported on a housing part of the water softener apparatus housing.

12. The water softener apparatus of claim 1, wherein the non-touch salt level indicator device is configured to inform a user of a salt level indication via an electronic communication medium.

13. The water softener apparatus of claim 1, wherein the non-touch salt level indicator device has two non-touch sensors for determining respective salt levels from respective upper end faces of two compressed salt blocks supported in respective parts of the chamber or respective chambers.

14. A water softener apparatus comprising:
a housing, said housing having a chamber for accommodating at least one compressed salt block, the compressed salt block having a weight in a range of 1 kg to 6 kg and having an elongate block form comprising vertical walls, a horizontal upper end face and a horizontal lower end face, the chamber adapted to the longitudinal external shape of the compressed salt block for insertion of the compressed salt block longitudinally into the chamber, the configuration being such that the compressed salt block is supported within said chamber with its longitudinal axis in a vertical orientation; wherein the compressed salt block has an inclined or inwardly curved functional side wall which abuts a surface of the water softener apparatus to maintain a vertical posture of the compressed salt block within the chamber as a lower end of the compressed salt block erodes to form brine;
a manually detachable front cover enclosing the chamber; and
a battery operated non-touch salt level indicator device comprising a housing and a time of flight sensor, said non-touch salt level indicator device housing mounted in or on said manually detachable front cover of the housing above the chamber so as to measure a salt level in the chamber from the horizontal upper end face of the compressed salt block supported in the chamber, the non-touch salt level indicator device measuring the salt level by reflecting a signal emitted by the time of flight sensor off the horizontal upper end face of the compressed salt block and by measuring a round-trip time of the reflected signal.

15. A water softener apparatus comprising:
a housing, said housing having a chamber for accommodating at least one compressed salt block having an elongate block form comprising vertical walls, a horizontal upper end face and a horizontal lower end face, the chamber adapted to the longitudinal external shape of the compressed salt block for insertion of the compressed salt block longitudinally into the chamber, the configuration being such that the compressed salt block is accommodated within said chamber with its longitudinal axis in a vertical orientation;
a front cover enclosing the chamber; and
a non-touch salt level indicator device comprising a housing and a time of flight sensor, said non-touch salt level indicator device housing mounted in or on said front cover of the housing above the chamber so as to determine a salt level in the chamber from the horizontal upper end face of the compressed salt block accommodated in the chamber, the non-touch salt level indicator device determining the salt level by reflecting a signal emitted by the time of flight sensor off the horizontal upper end face of the compressed salt block and by measuring a round-trip time of the reflected signal.

16. The water softener apparatus of claim 15, wherein the time of flight signal emitted by the sensor along or parallel to the longitudinal axis of the chamber to reflect off the upper end face of the compressed salt block.

17. The water softener apparatus of claim 1, wherein the compressed salt block has an inclined or inwardly curved functional side wall which abuts a surface of the water softener apparatus to maintain a vertical posture of the compressed salt block within the chamber as a lower end of the compressed salt block erodes to form brine.

18. The water softener apparatus of claim 1, wherein the time of flight sensor comprises an infrared time of flight sensor.

19. A method of measuring a level of salt in a water softener apparatus comprising a housing, said housing having a chamber for accommodating at least one compressed salt block having an elongate block form comprising vertical walls, a horizontal upper end face and a horizontal lower end face, the chamber adapted to the longitudinal external shape of the compressed salt block for insertion of the compressed salt block longitudinally into the chamber, the configuration being such that the compressed salt block is accommodated within said chamber with its longitudinal axis in a vertical orientation; a front cover enclosing the chamber; and a non-touch salt level indicator device comprising a housing and a time of flight sensor, said non-touch salt level indicator device housing mounted in or on said front cover of the housing above the chamber, the method comprising:

measuring a salt level in the chamber from the horizontal upper end face of the compressed salt by reflecting a signal emitted by the time of flight sensor of the non-touch salt level indicator device off the horizontal upper end face of the compressed salt block and determining a round-trip time of the reflected signal.

* * * * *